United States Patent
Tanaka et al.

(10) Patent No.: US 11,061,664 B2
(45) Date of Patent: Jul. 13, 2021

(54) CODE MANAGEMENT SYSTEM AND CODE MANAGEMENT METHOD

(71) Applicant: Hitachi, Ltd., Tokyo (JP)

(72) Inventors: Akira Tanaka, Tokyo (JP); Toshio Nishida, Tokyo (JP); Keisuke Hatasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/566,981

(22) Filed: Sep. 11, 2019

(65) Prior Publication Data

US 2020/0310787 A1      Oct. 1, 2020

(30) Foreign Application Priority Data

Mar. 27, 2019   (JP) ............................. JP2019-060359

(51) Int. Cl.
  *G06F 8/71*    (2018.01)
  *G06F 8/34*    (2018.01)

(52) U.S. Cl.
  CPC . *G06F 8/71* (2013.01); *G06F 8/34* (2013.01)

(58) Field of Classification Search
  CPC ..................................... G06F 8/71; G06F 8/34
  See application file for complete search history.

(56) References Cited

U.S. PATENT DOCUMENTS

| | | | |
|---|---|---|---|
| 7,428,726 B1 * | 9/2008 | Cowan ................... | G06F 11/368 717/121 |
| 2009/0016627 A1 * | 1/2009 | Uetani ................. | H04N 19/182 382/238 |
| 2012/0290959 A1 * | 11/2012 | Quine ..................... | G06F 3/048 715/765 |
| 2018/0052815 A1 * | 2/2018 | Hvezda .............. | H04N 5/23216 |
| 2018/0089063 A1 * | 3/2018 | Kral ..................... | G06F 11/3676 |
| 2018/0157579 A1 * | 6/2018 | Rozenberg ............ | G06F 9/4494 |
| 2018/0307589 A1 * | 10/2018 | Falkenberg ........... | G06F 40/106 |
| 2019/0179631 A1 * | 6/2019 | Benedetti ................ | G06F 8/658 |
| 2019/0243979 A1 * | 8/2019 | De Gaetano ............ | G06F 21/31 |

(Continued)

OTHER PUBLICATIONS

Huang et al, "Salient-Class Location: Help Developers Understand Code Change in Code Review", [Online], 2018, pp. 770-774, [Retrieved from internet on Mar. 1, 2021], <https://dl.acm.org/doi/pdf/10.1145/3236024.3264841> (Year: 2018).*

(Continued)

*Primary Examiner* — S. Sough
*Assistant Examiner* — Zengpu Wei
(74) *Attorney, Agent, or Firm* — Baker Botts L.L.P.

(57) ABSTRACT

To provide a user who reuses a flow edited by using visual programming with useful flow change related information, a code management system manages codes before and after editing of a flow edited by the user using visual programming, with a code management tool capable of version management, obtains a logic change degree that is an index indicating a degree of change in a logic related difference of differences before and after the code change and a layout change degree that is an index indicating a degree of change in a layout related difference of the differences before and after the code change, and outputs information based on the logic change degree and the layout change degree.

14 Claims, 10 Drawing Sheets

(56) References Cited

U.S. PATENT DOCUMENTS

2020/0019583 A1* 1/2020 Halfond ............... G06F 16/986
2020/0125345 A1* 4/2020 Belagali ................. G06F 8/34

OTHER PUBLICATIONS

Gethers et al, "Integrated Impact Analysis for Managing Software Changes", [Online], 2012, pp. 430-440, [Retrieved from internet on Mar. 1, 2021], <https://ieeexplore.ieee.org/stamp/stamp.jsp?tp=&arnumber=6227172> (Year: 2012).*

Sillito et al, "Managing Software Change Tasks: An Exploratory Study", [Online], 2005, pp. 23-32, [Retrieved from internet on Mar. 1, 2021], <https://ieeexplore.ieee.org/stamp/stamp.jsp?arnumber=1541811> (Year: 2005).*

"Version management with Git" by Nobuhiro Iwamatsu, Junich Kamikawa, Kohei Maeda, and Shinichiro Ogawa, Ohmsha, Ltd., 2011.

* cited by examiner

DEGREE-OF-CHANGE TABLE 700

| POST-CHANGE CODE ID | PRE-CHANGE CODE ID | LOGIC CHANGE DEGREE | LAYOUT CHANGE DEGREE |
|---|---|---|---|
| 0A0BC | 0D0CA | 10 | 10 |
| 0D0CA | 1020E | 1 | 15 |
| 1020E | 33F94 | 14 | 5 |
| : | : | : | : |

FIG. 7

CODE MANAGEMENT SYSTEM AND CODE MANAGEMENT METHOD

CROSS-REFERENCE TO RELATED APPLICATION

This application claims priority pursuant to 35 U.S.C. § 119 from Japanese Patent Application No. 2019-060359, filed on Mar. 27, 2019, the entire disclosure of which is incorporated herein by reference.

BACKGROUND

Technical Field

The present invention relates to a code management system and a code management method.

Related Art

A version management system, which is a file history system, is discussed in "Version management with Git" by Nobuhiro IWAMATSU, Junich KAMIKAWA, Kohei MAEDA, and Shinichiro OGAWA, Ohmsha, Ltd., 2011 (hereinafter, referred to as "non-patent literature 1"). It is described that the version management system stores a plurality of histories (versions) of a file generated by some work and provides a mechanism for retrieving an old version later, referring to differences, and confirming a history of file deletion or movement, as well as a file lock function and a merge function of integrating a plurality of changes. In addition, it is described that the version management system is classified into an individual version management system that performs version management in an individual system, a centralized version management system that centrally manages repositories on a server and enables a client to perform a commit operation and the like, and a distributed version management system that enables each client to manage repositories and links the repositories between clients.

A visual programming tool (hereinafter, referred to as "VP tool") that can develop software by describing a model diagram is attracting attention. In software development using the VP tool, information corresponding to the use, environment, and other situations is set, as attribute values (property values), to a node expressing various processing, and sequential processing is described as a flow by connecting nodes with lines. A user such as a software developer can intuitively develop software that performs processing as intended by using the VP tool.

In software development, for the purpose of improving development efficiency and the like, code sharing is performed by registering existing codes in a code management system (or a version management system), for example, disclosed in the non-patent literature 1. The user, by acquiring an arbitrary code from the code management system, can efficiently develop software by reusing the existing code. Similarly, in the development using the VP tool, the development efficiency can be improved by using the code management system.

In the above code management tool, a software product is managed as a code in a format tolerated by the code management tool. For example, sequential flows developed by Node-RED, which is a VP tool, is managed as a code in a JavaScript Object Notation (JSON) format based on JavaScript (registered trademark) in the code management tool.

In the VP tool, the above JSON formatted code includes information on flow processing structure (logic) such as addition and deletion of nodes and lines (hereinafter, referred to as "logic information") and information on layout such as node installation location and display size (hereinafter, referred to as "layout information"). The code management system performs code version management on the assumption that there are differences between codes before and after the change, not only when the flow logic information is changed (version upgrading) but also when the flow layout information is changed.

Therefore, for example, even when the node arrangement position is changed without affecting the flow processing structure, a user who uses a pre-change flow is required to decipher a code of a post-change flow and determine the necessity of updating the currently using flow to the post-change flow. Such a work is a big overhead in software development. On the other hand, when the layout information is changed with some intention, it is necessary to provide the user with information on the change.

SUMMARY OF THE INVENTION

In view of such a background, the present invention intends to provide a code management system and a code management method capable of providing useful information relating to a change of a flow edited by using visual programming.

One aspect of the present invention for achieving the above object is a code management system configured using an information processing device, the system including a code management unit configured to manage codes before and after editing of a flow edited by a user using visual programming with a code management tool capable of version management, a logic change degree calculation unit configured to perform processing for obtaining a logic change degree that is an index indicating a degree of change in a logic related difference of differences before and after the code change, a layout change degree calculation unit configured to perform processing for obtaining a layout change degree that is an index indicating a degree of change in a layout related difference of the differences before and after the code change, and a degree-of-change output unit configured to output information based on the logic change degree and the layout change degree.

In addition, the technical problem that the present application discloses and its solution method are clarified by the following description of an embodiment for carrying out the invention and attached drawings.

According to the present invention, it is possible to provide useful information relating to a change of a flow edited by using visual programming.

BRIEF DESCRIPTION OF THE DRAWINGS

FIG. 7 illustrates an exemplary degree-of-change table.

DETAILED DESCRIPTION OF THE EMBODIMENTS

Hereinafter, an embodiment for carrying out the invention will be described in detail below with reference to attached drawings.

Figure 1:
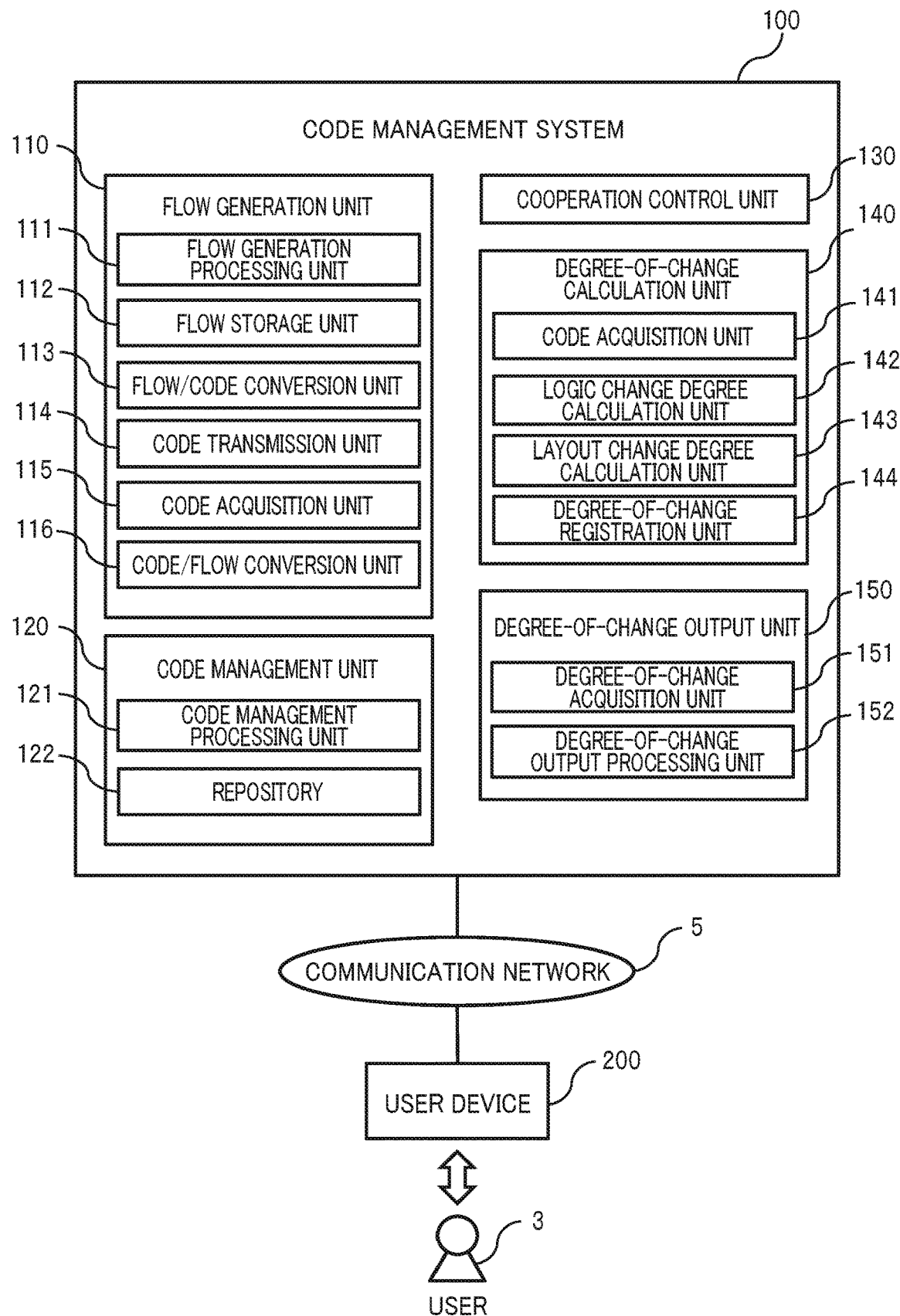
FIG. 1 is a diagram illustrating a schematic configuration of a code management system.

FIG. 1 illustrates a schematic configuration of a code management system 100 as an exemplary embodiment. As illustrated in the drawing, the code management system 100 is communicably coupled with a user device 200 via a communication network 5. The communication network 5 is a wireless or wired communication means, such as a local area network (LAN), a wide area network (WAN), Internet, a dedicated line, or various public telecommunication networks.

As illustrated in the drawing, the code management system 100 includes a flow generation unit 110, a code management unit 120, a cooperation control unit 130, a degree-of-change calculation unit 140, and a degree-of-change output unit 150 as functional units. The flow generation unit 110 provides the user device 200 with a flow editing environment base on visual programming. The code management unit 120 manages each code before and after editing a flow with a code management tool capable of performing version management. Of information indicating the difference before and after the change of the code (hereinafter, simply referred to as "difference"), the degree-of-change calculation unit 140 obtains a logic change degree that is an index indicating the degree of change in a logic related difference and a layout change degree that is an index indicating the degree of change in a layout related difference. When the code of the edited flow is registered in the code management tool, the cooperation control unit 130 causes the degree-of-change calculation unit 140 to start processing for obtaining the logic change degree and processing for obtaining the layout change degree. The degree-of-change output unit 150 provides the user device 200 with information based on the logic change degree and the layout change degree.

Figure 2:
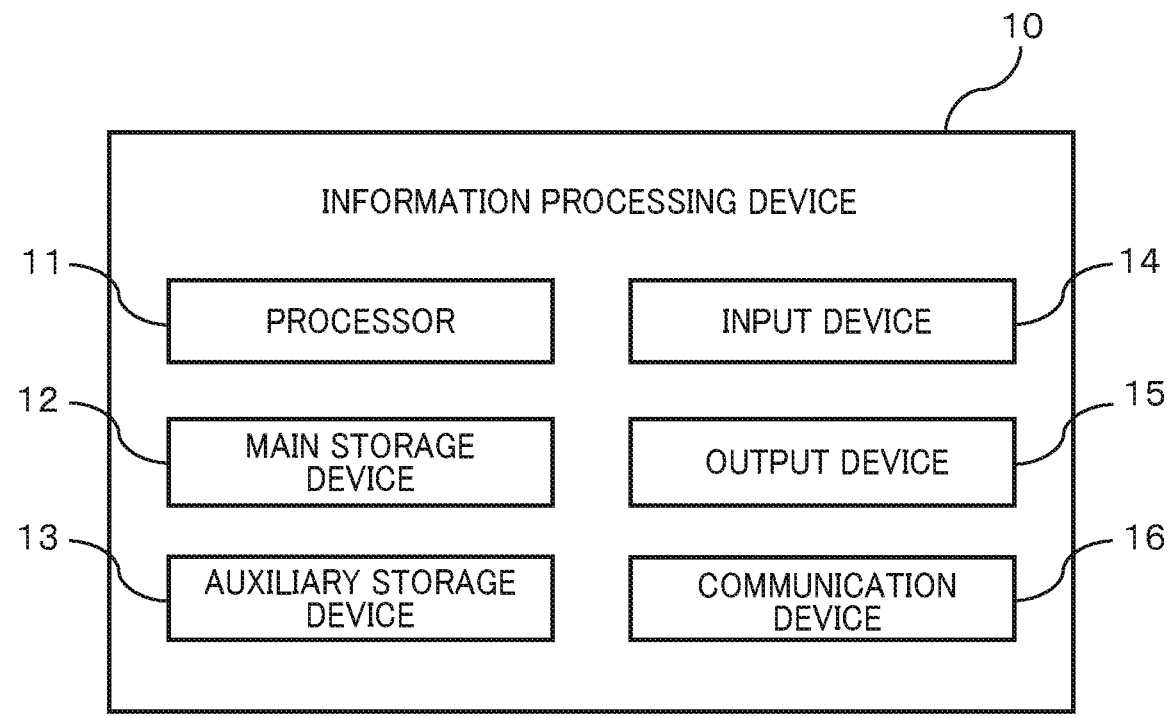
FIG. 2 illustrates an exemplary hardware configuration of an information processing device that configures the code management system.

FIG. 2 illustrates an exemplary hardware configuration of an information processing device used to realize the code management system 100 and the user device 200. As illustrated in the drawing, an exemplarily illustrated information processing device 10 includes a processor 11, a main storage device 12, an auxiliary storage device 13, an input device 14, an output device 15, and a communication device 16, which are communicably coupled with each other via an appropriate communication means, such as a bus (not illustrated).

The information processing device 10 is, for example, a personal computer (of desktop type or notebook type), an office computer, a mainframe, a smartphone, a tablet, or the like. The information processing device 10 may be realized using a virtual information processing resource, such as a cloud server provided by a cloud system. The information processing device may be an independent information processing device configured to realize each functional unit provided in the code management system 100. Alternatively, the information processing device 10 may be a common information processing device configured to realize two or more functional units. The above-mentioned functional units are communicably coupled with each other.

The processor 11 is, for example, configured by a central processing unit (CPU), a micro processing unit (MPU), a graphics processing unit (GPU), an artificial intelligence (AI) chip, a field programmable gate array (FPGA), an application specific integrated circuit (ASIC) or the like.

The main storage device 12 is a device for storing programs and data, and is, for example, a read only memory (ROM), a random access memory (RAM), a nonvolatile memory (nonvolatile RAM (NVRAM)), or the like.

The auxiliary storage device 13 is, for example, a hard disk drive, a solid state drive (SSD), an optical storage device (a compact disc (CD), a digital versatile disc (DVD), etc.), a storage system, a read/write device for a recording medium, such as an IC card, an SD card, or an optical recording medium, a storage area of the cloud server, or the like. Programs and data can be read into the auxiliary storage device 13 via a recording medium reading device or the communication device 16. Programs and data stored in the auxiliary storage device 13 can be read at any time into the main storage device 12.

The input device 14 is an interface for accepting an input from the outside, and is, for example, a keyboard, a mouse, a touch panel, a card reader, a voice input device, or the like.

The output device 15 is an interface for outputting various information, such as processing progress and processing results. The output device 15 is, for example, a display device (e.g., a liquid crystal monitor, a liquid crystal display (LCD), or a graphic card) for visualizing the above-mentioned various information, a sound reproduction device (e.g., a voice output device (such as a speaker)) for voicing the above-mentioned various information, or a character output device (e.g., a printing device) for converting the above-mentioned various information into text. For example, the information processing device 10 may be configured to input and output information from and to other devices via the communication device 16.

The communication device 16 is a device for realizing communications with other devices. The communication device 16 is a wired or wireless communication interface that realizes communications with other devices via a communication means, such as a local area network (LAN), a wide area network (WAN), or Internet, and is, for example, a network interface card (NIC), a wireless communication module, a universal serial bus (USB) module, a serial communication module, or the like.

The functions of the code management system 100 and the user device 200 can be realized by the processor 11 of the information processing device 10, which reads out and executes programs stored in the main storage device 12 of the information processing device 10, or by hardware (AI chip, FPGA, ASIC, or the like) of the information processing device 10. The information processing device 10 configuring the code management system 100 and the user device 200 may be configured to include functions of an operating system, a device driver, a file system, a database management system (DBMS), and the like.

As illustrated in FIG. 1, the flow generation unit 110 has a flow generation processing unit 111, a flow storage unit 112, a flow/code conversion unit 113, a code transmission unit 114, a code acquisition unit 115, and a code/flow conversion unit 116 as functional units. The functions of the flow generation unit 110 are provided, for example, by a visual programming tool (hereinafter, referred to as "VP tool"). In the following description, a case where the VP tool is Node-RED will be described as an example, but the type of the VP tool is not necessarily limited.

Of the above-mentioned functional units, the flow generation processing unit 111 provides the user device 200 with an editing environment for software (hereinafter, referred to as "flow"). The user device 200 accesses the editing environment via, for example, a web browser. The flow storage unit 112 stores flow related information generated by the flow generation processing unit 111.

The flow/code conversion unit 113 converts the flow generated by the flow generation processing unit 111 into a code (e.g., a code in JavaScript Object Notation (JSON) format when the VP tool is Node-RED). The code transmission unit 114 transmits the code obtained through the conversion to the code management unit 120.

The code acquisition unit 115 acquires a code from the code management unit 120. The code/flow conversion unit 116 converts the code acquired by the code acquisition unit 115 into a flow and provides the converted flow to the VP tool. As a result, a user 3 can edit flows by reusing existing codes managed by the code management unit 120.

The code management unit 120 has a code management processing unit 121 and a repository 122 as functional units. The functions of the code management unit 120 can be realized using, for example, the code management tool (e.g., GitHub (registered trademark) or GitLab (registered trademark)).

The code management processing unit 121 receives a code from the flow generation unit 110 and registers the received code in the repository 122. Further, the code management processing unit 121 acquires a code whose version is designated by the flow generation unit 110 from the repository 122, and transmits the acquired code to the flow generation unit 110.

In response to registration of a new version of the code in the repository 122 of the code management unit 120, the cooperation control unit 130 causes the degree-of-change calculation unit 140 to start processing for calculating the degree of change (i.e., the logic change degree and the layout change degree described above) that is an index indicating the importance of the change of the code relative to a pre-change code. The functions of the cooperation control unit 130 can be realized using, for example, a continuous integration (CI) tool. The CI tool is a tool for realizing continuous integration and is, for example, Jenkins (registered trademark) or Drone. The GitLab (registered trademark) can install the CI tool as an addition function. The GitLab (registered trademark) has a function of notifying various events. For example, setting a "webhook" function in advance can notify registration of codes in GitLab (registered trademark) to the outside. For example, the cooperation control unit 130 hooks the notification and activates a script that realizes the functions of the degree-of-change calculation unit 140.

The degree-of-change calculation unit 140 calculates the degree of change (the logic change degree and the layout change degree). As illustrated in the drawing, the degree-of-change calculation unit 140 has a code acquisition unit 141, a logic change degree calculation unit 142, a layout change degree calculation unit 143, and a degree-of-change registration unit 144 as functional units. For example, these functional units can be realized by the CI tool executing the script.

Of the above-mentioned functional units, the code acquisition unit 141 acquires a code registered in the repository 122 from the code management unit 120. The logic change degree calculation unit 142 obtains the logic change degree. The layout change degree calculation unit 143 obtains the layout change degree. The degree-of-change registration unit 144 registers the logic change degree and the layout change degree in the repository 122 while associating them with the code of the code management unit 120.

The degree-of-change output unit 150 illustrated in FIG. 1 provides the user 3 with degree-of-change related information. As illustrated in the drawing, the degree-of-change output unit 150 has a degree-of-change acquisition unit 151 and a degree-of-change output processing unit 152. The degree-of-change acquisition unit 151 acquires code related information and degree-of-change related information from the repository 122 of the code management unit 120. The degree-of-change output processing unit 152 provides the user device 200 with code related information and degree-of-change information. The functions of the degree-of-change output unit 150 can be realized, for example, using the functions of GitLab (registered trademark) or the like.

Figure 3:
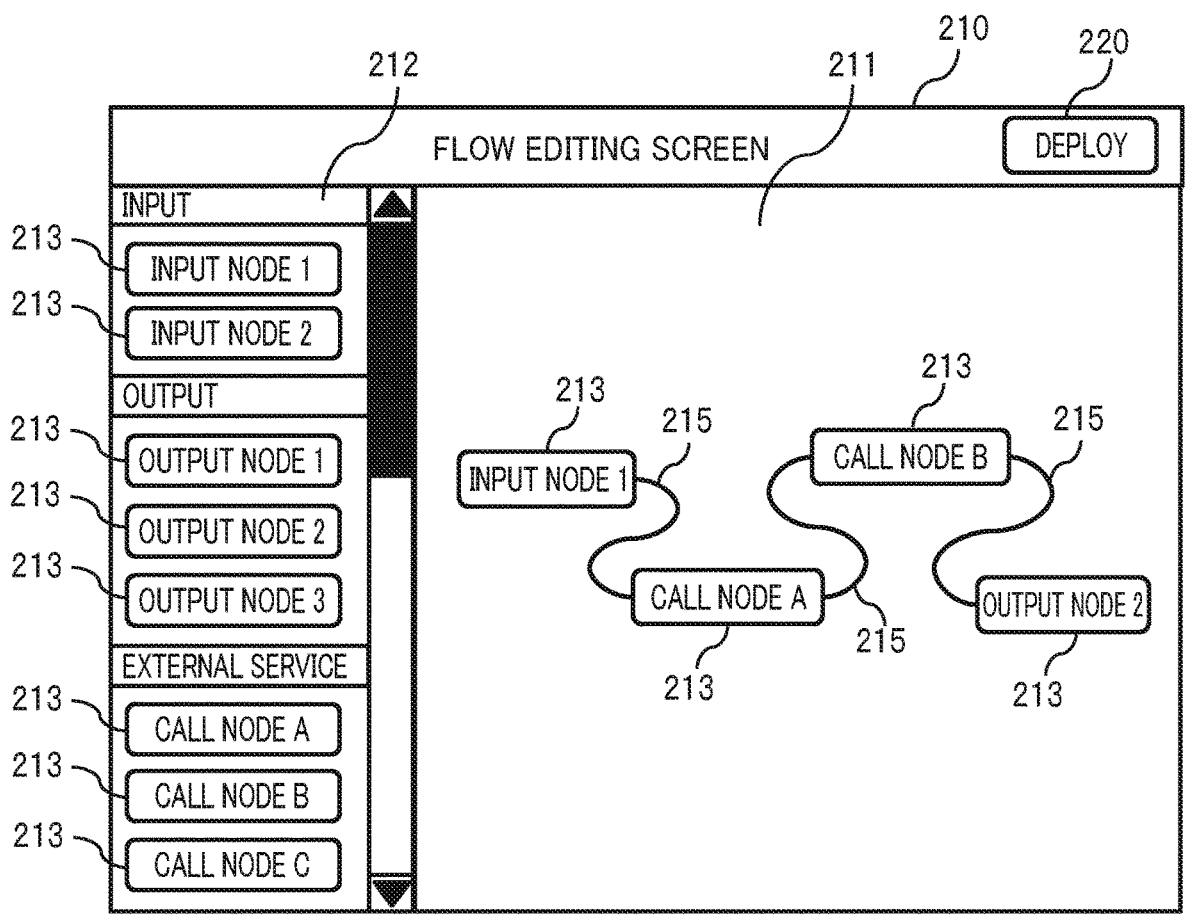
FIG. 3 illustrates an exemplary flow editing screen.

FIG. 3 illustrates an exemplary screen (hereinafter, referred to as "flow editing screen 210") that can be provided to the user device 200 by the VP tool. The user 3 refers to the flow editing screen 210 while referring to a web browser or the like that operates on the user device 200 and performs flow editing (including the case of newly creating a flow).

The exemplarily illustrated flow editing screen 210 has a flow editing area 211 and a pallet area 212. A plurality of parts (hereinafter, referred to as "nodes 213") prepared for respective functions (data input function, data output function, external service function and the like) is displayed in the pallet area 212. The user 3 performs flow editing by selecting a node 213 in the pallet area 212 and then dragging and dropping it in the flow editing area 211. The user 3 can define the execution order of the nodes 213 by coupling the nodes 213 with wires 215. The execution order is defined in such a manner that the processing of a following node 213 is executed after the processing of a preceding node 213 is completed when the right side of the preceding node 213 is coupled with the left side of the following node 213 with the wire 215.

Figure 4A:
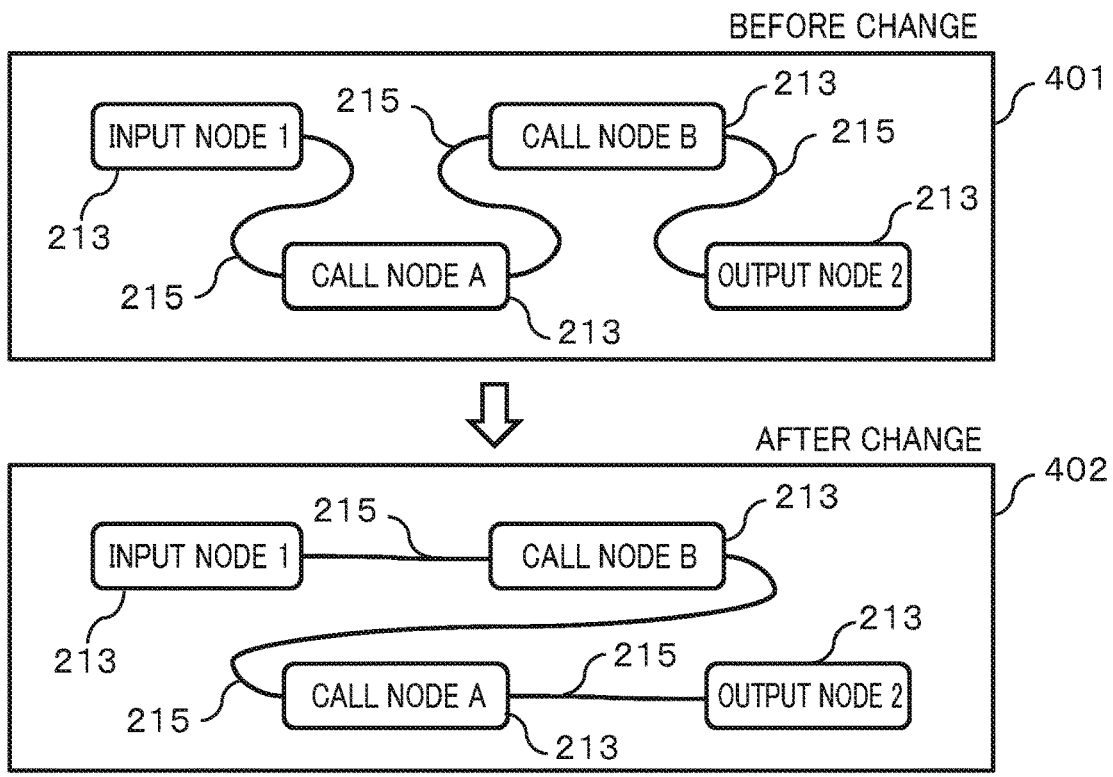
FIG. 4A illustrates an exemplary flow editing in the case of flow logic change.
Figure 4B:
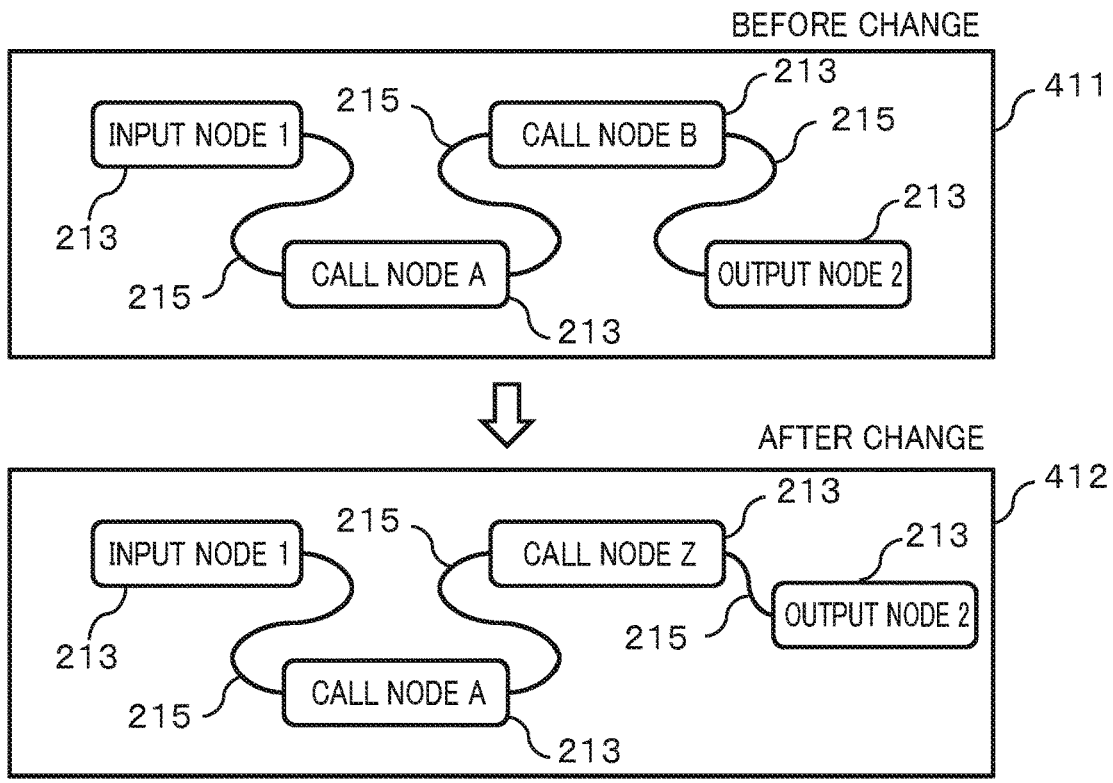
FIG. 4B illustrates an exemplary flow editing in the case of flow layout change.

FIGS. 4A and 4B illustrate examples of the flow editing. FIG. 4A illustrates an exemplary case of changing the flow logic. In a flow 401 before the change illustrated in the drawing, "input node 1" and "call node A" are coupled by wire 215, "call node A" and "call node B" are coupled by wire 215, "call node B" and "output node 2" are coupled by wire 215, sequentially, and processing is executed in the order of "input node 1", "call node A", "call node B", and "output node 2". On the other hand, in a flow 402 after the change illustrated in the drawing, "input node 1" and "call node B" are coupled by wire 215, "call node B" and "call node A" are coupled by wire 215, "call node A" and "output node 2" are coupled by wire 215, sequentially, and processing is executed in the order of "input node 1", "call node B", "call node A", and "output node 2". In this case, the execution order is changed with respect to "call node A" and "call node B" before and after the editing, and accordingly the flow logic is changed.

FIG. 4B illustrates an exemplary case of changing the flow layout. In a flow 411 before the change illustrated in the drawing, "input node 1" and "call node A" are coupled by wire 215, "call node A" and "call node B" are coupled by wire 215, "call node B" and "output node 2" are coupled by wire 215, sequentially, and processing is executed in the order of "input node 1", "call node A", "call node B", and "output node 2". On the other hand, in a flow 412 after the change illustrated in the drawing, "input node 1" and "call node A" are coupled by wire 215, "call node A" and "call node Z" are coupled by wire 215, "call node Z" and "output node 2" are coupled by wire 215, sequentially, and processing is executed in the order of "input node 1", "call node A", "call node Z", and "output node 2". In this case, the label of "call node B" is changed to "call node Z" by editing, and the arrangement position of "output node 2" is moved upward, and further the position of wire 215 coupling "call node B" ("call node Z") and "output node 2" is moved correspondingly. However, since the coupling between the nodes 213 is not changed, there is no logic change and only the layout is changed.

Figure 5:
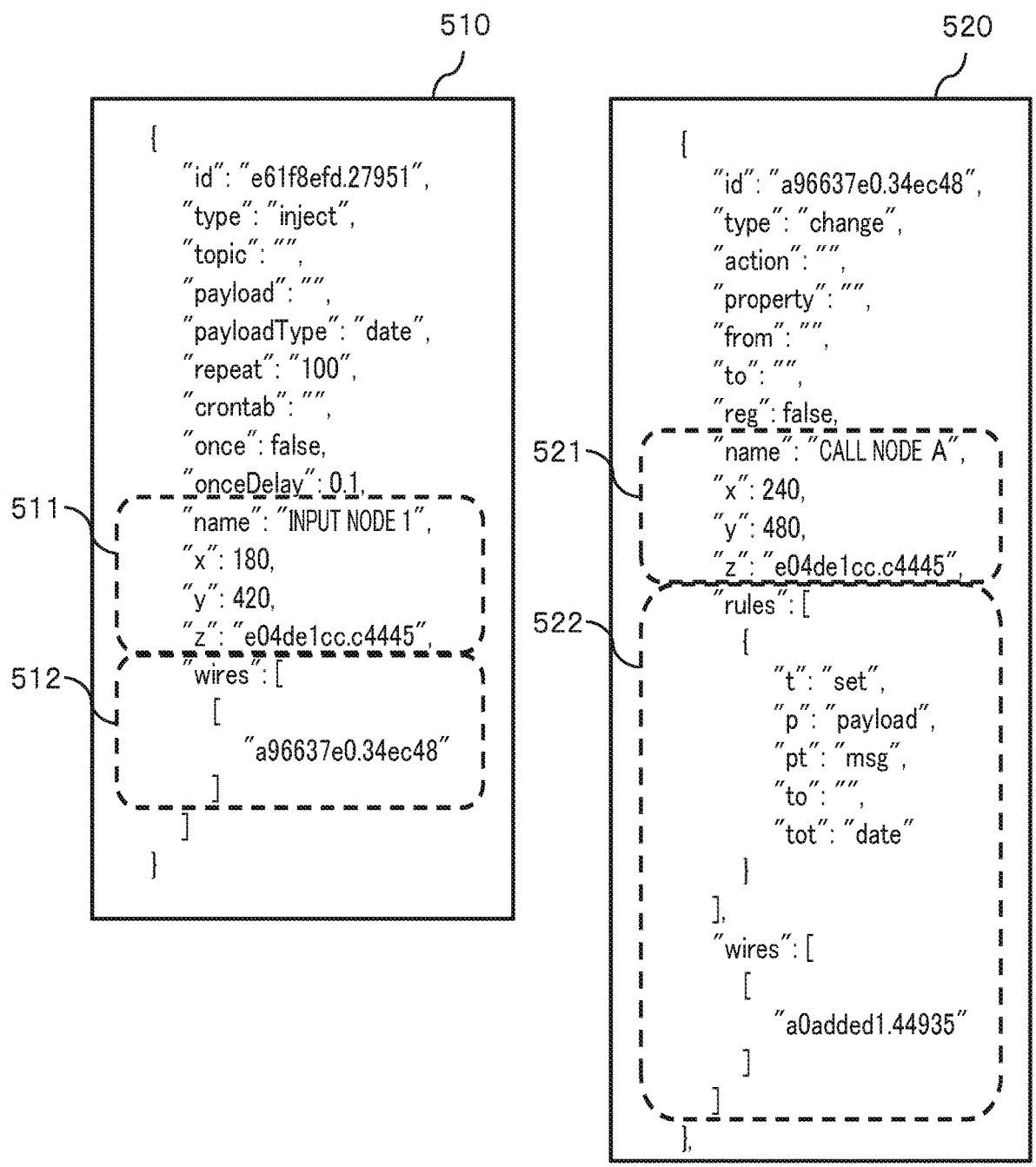
FIG. 5 illustrates exemplary codes described in the JSON format.

FIG. 5 illustrates exemplary codes described in the JSON format generated by the flow/code conversion unit 113 based on a flow. The description indicated by reference numeral 511 of code 510 illustrated in the drawing is a node layout related description of the node named "input node 1", which defines "x" item, "y" item, and "z" item as coordinate data representing the installation location of the node on the flow editing screen 210 as well as "name" item to be displayed as node name. The description indicated by reference numeral 512 of code 510 is a logic related description of the node named "input node A", which defines a list of identifiers of nodes with which lines of corresponding nodes are coupled (the values of item "wires").

Further, the description indicated by reference numeral 521 of code 520 illustrated in the drawing is a node layout related description, which defines "x" item, "y" item, and "z" item as coordinate data representing the installation location of the node on the flow editing screen 210 as well as "name" item to be displayed as node name. The description indicated by reference numeral 522 of code 520 is a logic related description, which includes a list ("wires" item) of nodes with which lines of corresponding nodes are coupled and a definition (the values of item "rules") of node operation related attribute values (property values).

Next, exemplary processing that can be performed by the code management system 100 having the above configuration will be described.

Figure 6:
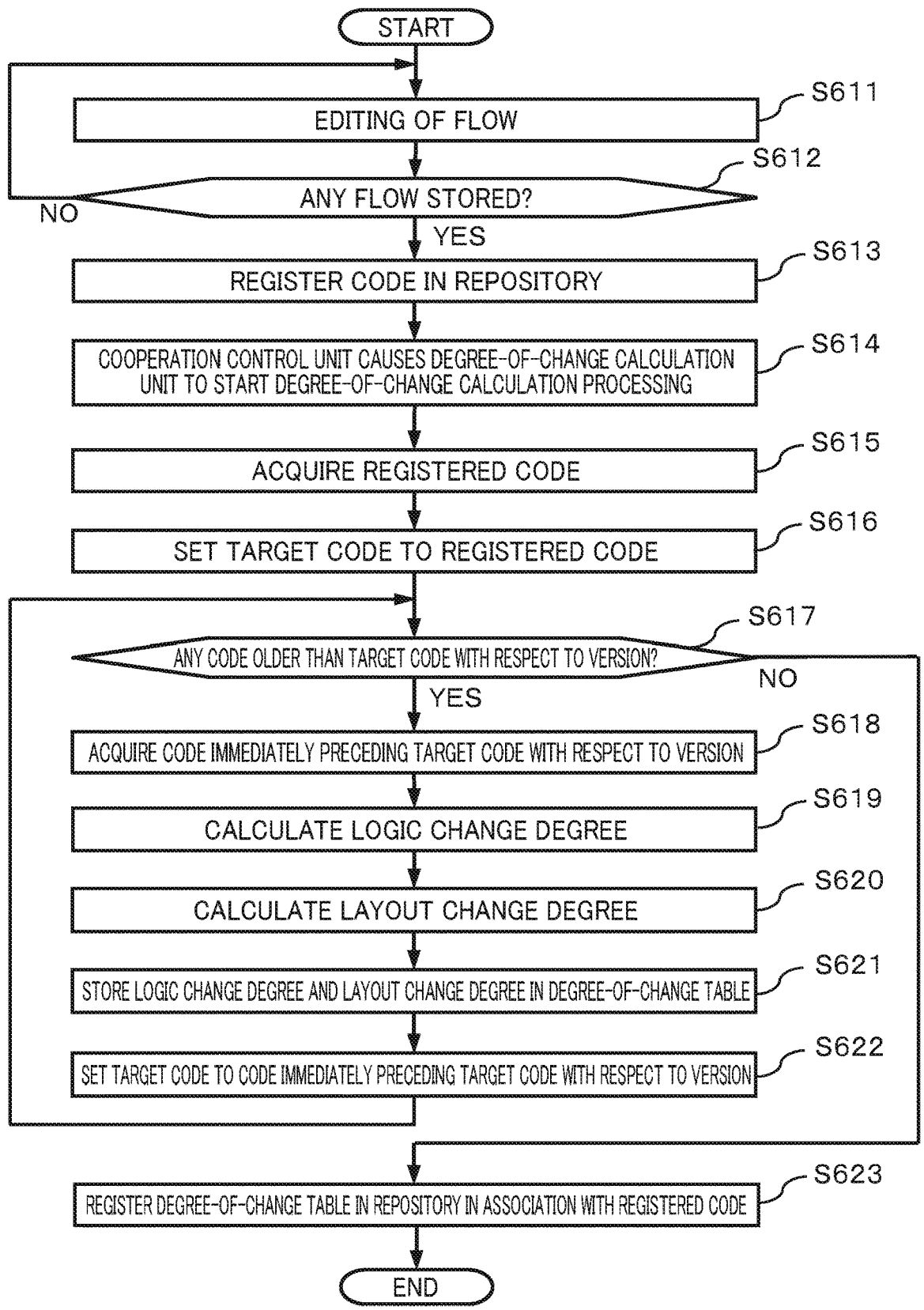
FIG. 6 is an exemplary flowchart illustrating degree-of-change calculation processing.

FIG. 6 is a flowchart presenting processing (hereinafter, referred to as "degree-of-change calculation processing S600") performed in the code management system 100 when editing a flow. Hereinafter, the degree-of-change calculation processing S600 will be described with reference to FIG. 6.

First, the user 3 accesses, using a web browser or the like at the user device 200, the flow editing screen 210 provided by the flow generation processing unit 111 and performs flow editing (S611).

When the user 3 terminates the flow editing and performs a file save operation on the flow editing screen 210 (for example, when a deploy button 220 illustrated in FIG. 3 is operated or a save operation (menu operation or the like) to the repository 122 is performed), the flow storage unit 112 stores edited flow information. Further, the flow/code conversion unit 113 converts the edited flow into a code, and the code transmission unit 114 transmits the obtained code to the code management unit 120 (S612).

The code management processing unit 121, when receiving the code, registers the received code in the repository 122 (S613).

The cooperation control unit 130, when detecting the registration of the code in the repository 122, causes the degree-of-change calculation unit 140 to start processing for calculating the degree-of-change (S614).

In the above-described processing, first, the code acquisition unit 141 of the degree-of-change calculation unit 140 acquires the registered code from the repository 122 (S615).

Subsequently, as an initial setting in loop processing from S617, the degree-of-change calculation unit 140 sets a degree-of-change acquisition target code (hereinafter, referred to as "target code") to the code (hereinafter, referred to as "registered code") acquired from the repository 122 in S615.

The processing from S617 is loop processing in which the degree-of-change calculation unit 140 obtains the degree of change (i.e., a logic change degree and a layout change degree) between respective versions of the registered code.

In the above loop processing, first, the degree-of-change calculation unit 140 determines whether or not any code older than the target code with respect to a version is present in the repository 122 (S617). For example, the degree-of-change calculation unit 140 performs the determination based on a code change log managed by GitLab (registered trademark). If there is no code older than the target code with respect to a version in the repository 122 (NO in S617), the degree-of-change calculation processing S600 terminates. On the other hand, when any code older than the target code with respect to a version is present in the repository 122 (YES in S617), the processing proceeds to S618.

In S618, the degree-of-change calculation unit 140 acquires a code immediately preceding the target code with respect to a version from the repository 122 of the code management unit 120.

Subsequently, the logic change degree calculation unit 142 calculates a logic change degree for the target code and the code of the immediately preceding version (S619). Details of the logic change degree calculation will be described below.

Subsequently, the layout change degree calculation unit 143 calculates a layout change degree for the target code and the code immediately preceding the target code with respect to a version (S620). Detailed acquisition of the layout change degree will be described below.

Subsequently, the degree-of-change calculation unit 140 stores the logic change degree obtained in S619 and the layout change degree obtained in S620 (S621). In the present example, the logic change degree and the layout change degree are stored in a table (hereinafter, referred to as "degree-of-change table 700").

FIG. 7 illustrates an example of the degree-of-change table 700. As illustrated in the drawing, the degree-of-change table 700 is configured by one or more recodes each including respective items of a post-change code ID 711, a pre-change code ID 712, a logic change degree 713, and a layout change degree 714. An identifier (hereinafter, referred to as "code ID") of a post-change code of codes before and after the change is set in the post-change code ID 711. For example, the code ID is a version number of the code. A code ID of a pre-change code of the codes before and after the change is set in the pre-change code ID 712. The logic change degree obtained in S619 for the codes before and after the change is set in the logic change degree 713. The layout change degree obtained in S620 for the codes before and after the change is set in the layout change degree 714.

Referring back to FIG. 6, subsequently, the degree-of-change calculation unit 140 sets the target code to the code immediately preceding the target code with respect to a version (S622). Subsequently, the processing returns to S616.

According to the above loop processing (S617 to S622), at the timing when the latest flow is changed, the degree of change between respective versions of the code of the flow is calculated retroactively to the past version. If the flow has been changed in the past and the degree of change between old versions has already been calculated, the degree-of-change calculation processing for the old versions may be omitted.

In S623, the degree-of-change registration unit 144 registers the contents of the degree-of-change table 700 in the repository 122 in association with the registered code. For example, any file representing the contents of the degree-of-change table 700, such as a comma-separated values (CSV) format file or a data management file in a predetermined format of DBMS, may be registered in the repository 122. Thus, the degree-of-change calculation processing S600 terminates.

Subsequently, an exemplary method for calculating the logic change degree in S619 of FIG. 6 will be described in detail below. First, the logic change degree calculation unit 142 acquires the number of increased/decreased nodes between flows before and after the change with reference to differences between the codes before and after the change. In addition, the logic change degree calculation unit 142 extracts information on the logic of each node (hereinafter, referred to as "logic information") from the codes before and after the change, and acquires differences focusing on the logic. The logic change degree calculation unit 142 acquires the logic information from, for example, a JSON format file acquired from GitLab (registered trademark). For example, in the example illustrated in FIG. 5, the descriptions indicated by reference numeral 512 in code 510 and reference numeral 522 in code 520 are logic information.

Further, for example, for contents in which there is any difference with respect to the number of increased/decreased nodes or the node logic information, the logic change degree calculation unit 142 calculates, as the logic change degree, a value obtained by adding a weighted value according to the contents. For example, when the differences between the flows before and after the change include node increase/decrease (node addition/deletion), the logic change degree calculation unit 142 adds the number of increased/decreased nodes to the logic change degree with a threefold weight. When there is any change in the line for coupling nodes, the logic change degree calculation unit 142 adds the number of changed lines to the logic change degree with a threefold weight. If there is any difference in the contents of a Function node that can describe a JavaScript (registered trademark) code as processing contents, the logic change degree calculation unit 142 adds the number of changes to the logic change degree with a twofold weight. If there is any difference in node attribute value (property value), the logic change degree calculation unit 142 adds the number of changes to the logic change degree directly (with a weight of 1).

Subsequently, an exemplary method for calculating the layout change degree in S620 of FIG. 6 will be described in detail below. First, the layout change degree calculation unit 143 acquires information on the layout of each node (hereinafter, referred to as "layout information") from the codes before and after the change, and acquires differences focusing on the layout. The layout change degree calculation unit 143 acquires the layout information from, for example, a JSON format file for the flow acquired from GitLab (registered trademark). For example, in the example illustrated in FIG. 5, the descriptions indicated by reference numeral 511 in code 510 and reference numeral 521 in code 520 are layout information.

Then, for example, for contents in which there is any difference with respect to the layout information, the layout change degree calculation unit 143 calculates, as the layout change degree, a value obtained by adding a weighted value according to the contents. For example, the layout change degree calculation unit 143 calculates, as the layout change degree, a result obtained by adding a weighted value according to difference contents, by adding a weighted value for the number of nodes differed in the coordinates where they are placed, that is, nodes whose arrangement position has moved, or adding a weighted value for the movement distance of the arrangement position calculated from the coordinate differences.

When editing a code using the VP tool, the node may move due to an operation error by the user 3 or the like. Therefore, it may be desired to suppress the influence on the layout change degree due to minor layout changes. Specifically, for example, instead of obtaining the layout change degree based on the absolute value of the movement distance, it is configured to obtain the layout change degree based on the ratio of the movement distance to the size of the entire flow displayed in the flow editing area 211 of the flow editing screen 210. Further, for example, a threshold is set for the absolute value of the movement distance or the above-mentioned ratio, and the degree of influence on the layout change degree is suppressed when the absolute value of the movement distance or the ratio is equal to or less than the threshold.

When calculating either the logic change degree or the layout change degree, the weighting coefficient may be a fixed value. Alternatively, the code management system 100 may be provided with a user interface for accepting weight settings, managed so that the user 3 or the like can set the weighting value, and configured to cause the degree-of-change calculation unit 140 to refer to the managed weighting value appropriately.

Figure 8:
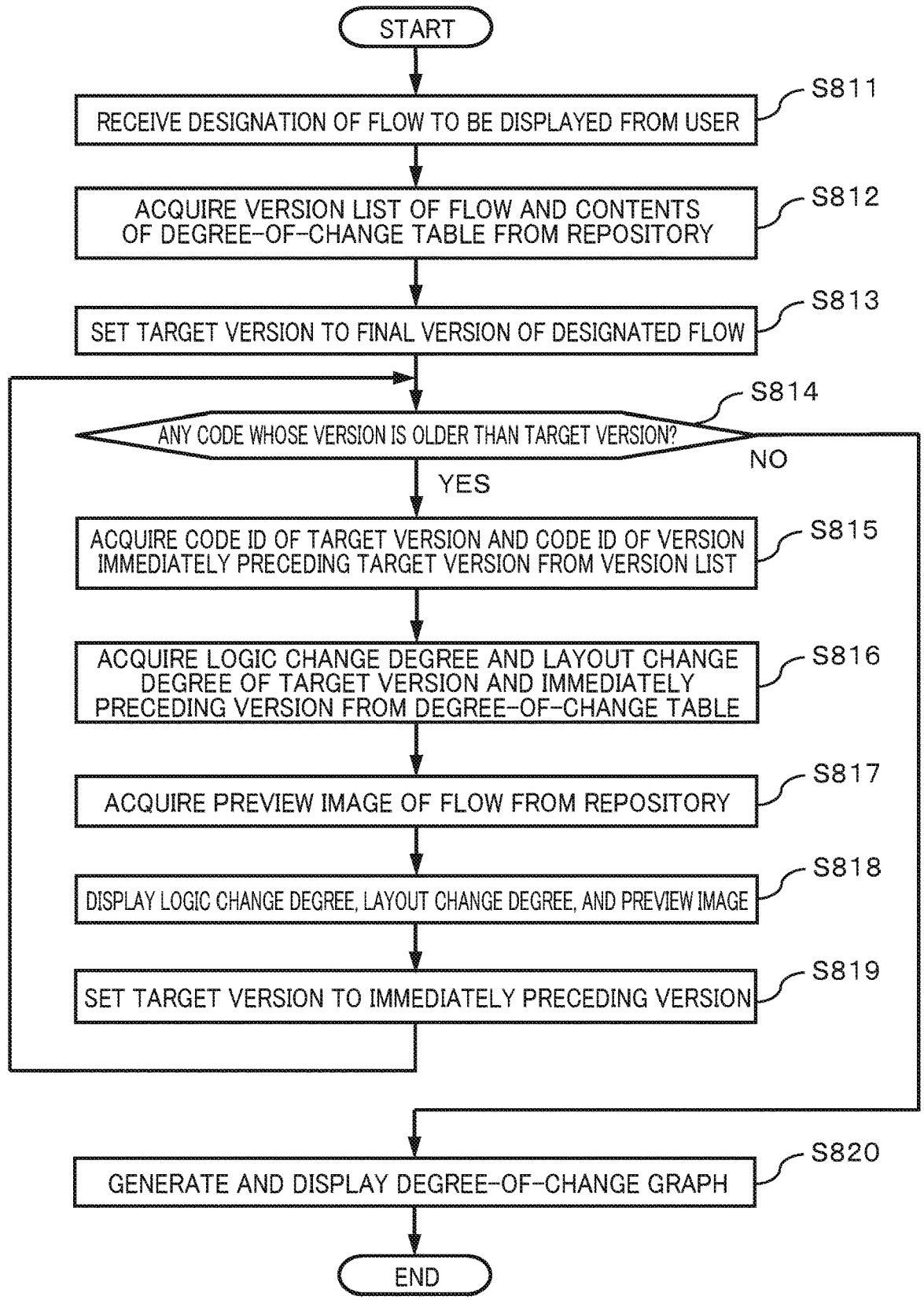
FIG. 8 is an exemplary flowchart presenting degree-of-change output processing.

FIG. 8 is a flowchart presenting processing (hereinafter, referred to as "degree-of-change output processing S800") performed in the code management system 100 when presenting code degree-of-change information to the user 3. For example, when reusing a code registered in the repository 122, the user refers to the code degree-of-change information. Hereinafter, the degree-of-change output processing S800 will be described with reference to FIG. 8.

First, the user 3 accesses, using a web browser or the like of the user device 200, a screen (hereinafter, referred to as "degree-of-change display screen 900") provided by the degree-of-change output unit 150 and designates a flow (for example, designates a file name, GitLab (registered trademark) project, or the like) (S811).

Subsequently, the degree-of-change acquisition unit 151 acquires, from the repository 122 of the code management unit 120, a change log (version list) of the flow (code) designated by the user and the contents of the degree-of-change table 700 registered in the repository 122 in association with the flow (code) (S812).

Subsequently, as an initial setting in loop processing from S814, the degree-of-change output processing unit 152 sets the latest version of the flow designated by the user as a target version in the loop processing (hereinafter, referred to as "target version") (S813).

The processing from S814 is loop processing in which the degree-of-change output processing unit 152 sequentially displays the degree of change between respective versions of the flow designated in S811.

First, in S814, the degree-of-change output processing unit 152 determines whether or not any code whose version is older than the target version is present in the repository 122. For example, the degree-of-change output processing unit 152 performs the determination based on a code change log managed by GitLab (registered trademark). If there is no code whose version is older than the target version in the repository 122 (NO in S814), the degree-of-change output processing S800 terminates. On the other hand, when any code whose version is older than the target version is present in the repository 122 (YES in S814), the processing proceeds to S815.

In S815, the degree-of-change output processing unit 152 acquires, from the code management unit 120, a code ID of the code of the target version and a code ID of the code of a version immediately preceding the target version.

Subsequently, the degree-of-change output processing unit 152 searches the degree-of-change table 700 using the code ID of the target version code and the code ID of the code of the immediately preceding version as keys, and acquires the logic change degree and the layout change degree corresponding to the keys (S816).

Subsequently, the degree-of-change output processing unit 152 acquires a preview image of the flow from the repository 122 of the code management unit 120 (S817). For example, the preview image is an image obtained by screen-capturing the entire flow displayed in the flow editing area 211 of the flow editing screen 210.

Subsequently, the degree-of-change output processing unit 152 generates the degree-of-change display screen 900 including descriptions of target version related information (hereinafter referred to as "code information" including the logic change degree and the layout change degree of the target version, and the preview image) and transmits the degree-of-change display screen 900 to the user device 200 (S818).

Subsequently, the degree-of-change output processing unit 152 sets the target version to the immediately preceding version (S819). Subsequently, the processing returns to S814.

Figure 9:
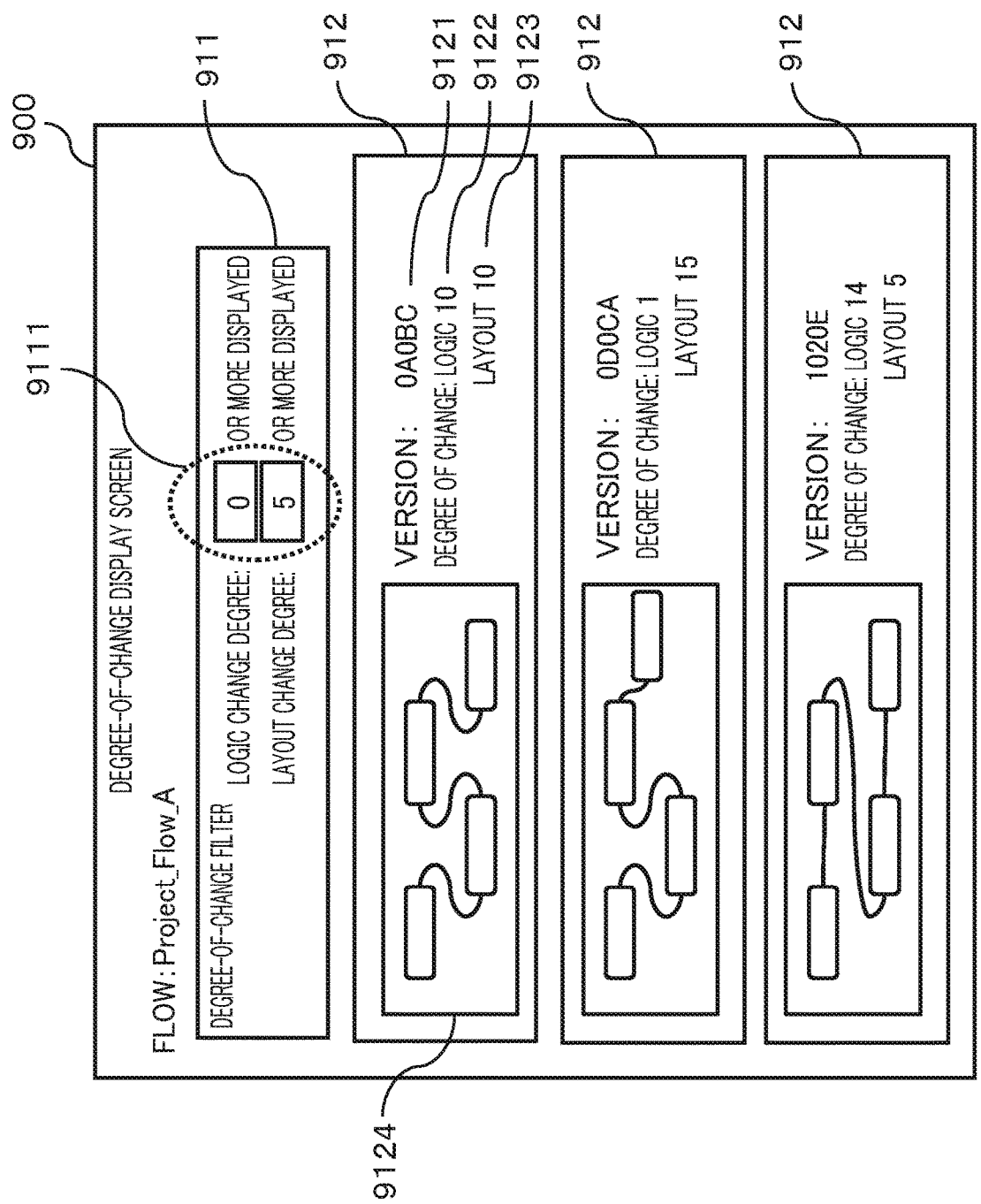
FIG. 9 illustrates an exemplary degree-of-change display screen.

FIG. 9 illustrates an example of the degree-of-change display screen 900 that the degree-of-change output processing unit 152 displays on the user device 200 in S818. As illustrated in the drawing, the degree-of-change display screen 900 has a filter condition setting area 911 and one or more code information display areas 912 provided for respective versions of the code. The exemplarily illustrated degree-of-change display screen 900 targets a flow code created in a project named "Project_Flow_A".

A condition setting column 9111 for narrowing down (filtering) the number of the code information display areas 912 to be displayed is displayed in the filter condition setting area 911. In the case of the exemplarily illustrated degree-of-change display screen 900, the user 3 can set a lower-limit threshold of the logic change degree and a lower-limit threshold of the layout change degree for the version to be displayed in the code information display areas 912. The method for setting the conditions is not necessarily limited. It may be configured to display only a limited amount of version information according to a fixed number set in advance or the number designated by the user 3.

Each of the code information display areas 912 is a field for displaying information of the code including a version 9121, a logic change degree 9122, a layout change degree 9123, and a preview image 9124. As described above, since the degree of change is presented on the degree-of-change display screen 900 along with the history of the code change, it is possible to provide useful information to the user 3 who intends to reuse the code and the user 3 can efficiently reuse the code based on the provided information.

Referring back to FIG. 8, subsequently, the degree-of-change output processing unit 152 generates an image (hereinafter, referred to as "degree-of-change transition graph 1000") in which transition of the degree of change (i.e., the logic change degree and the layout change degree) is expressed in a graph and causes the user device 200 to display the generated image (S820).

Figure 10:
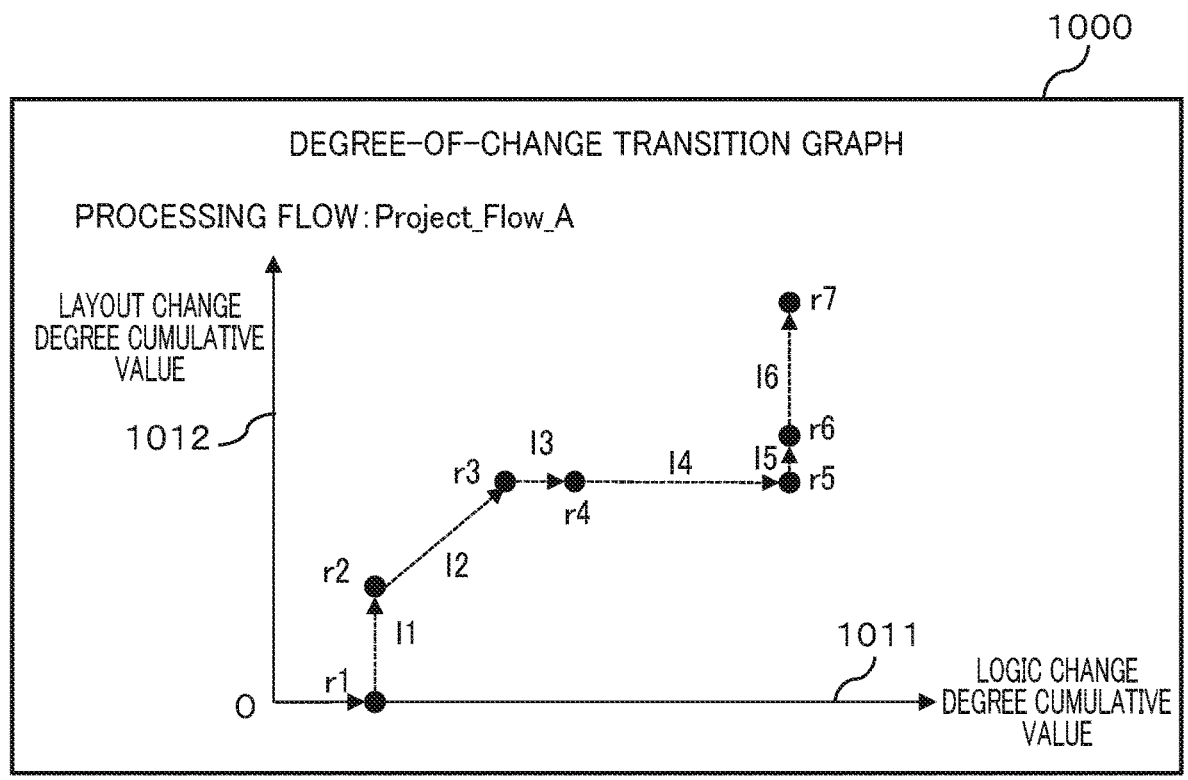
FIG. 10 illustrates an exemplary degree-of-change transition graph.

FIG. 10 illustrates an example of the degree-of-change transition graph 1000. The exemplarily illustrated degree-of-change transition graph 1000 targets a flow code created in the project named "Project_Flow_A". As illustrated in the drawing, the exemplarily illustrated degree-of-change transition graph 1000 is for plotting the degree of change of each version of the flow, with the axis of abscissa representing logic change degree cumulative value 1011 and the axis of ordinate representing layout change degree cumulative value 1012. In the drawings, respective points indicated by reference numerals r1, r2, . . . , r7 plotted from the origin O represent codes of corresponding versions. Line segments connecting these points and indicated by reference numerals 11, 12, . . . , 16 indicate a transition of the degree-of-change cumulative value (the cumulative value of each of the logic change degree and the layout change degree). The user 3 can visually grasp the transition of the degree of change from the degree-of-change transition graph 1000. For example, it is possible to intuitively determine the necessity of version upgrading of a flow in use (for example, when the cumulative value of the logic change degree is large, it is determined that the version upgrading is necessary, and when only the cumulative value of the layout change degree is large, it is determined that the version upgrading is unnecessary). Thus, the degree-of-change output processing S800 terminates.

As described above, the code management system 100 according to the present embodiment can provide useful information based on respective viewpoints of logic and layout when a flow edited using visual programming is changed. Therefore, the user 3 can efficiently reuse existing codes.

The present invention is not limited to the above-described embodiment and can be modified in various ways. For example, the above-described embodiment has been described in detail for easy understanding of the present invention, and does not intend to narrowly limit the invention to the one having all the configurations described. Further, the configuration of the above-described embodiment can be partly replaced by a configuration of another embodiment. Further, a configuration of another embodiment can be added to the configuration of the above-described embodiment. In addition, for any possible modification of the above-described embodiment, it is possible to appropriately employ addition, deletion, and replacement for a partial configuration in consideration of other embodiments.

Each of the above-described configurations, functions, processing units, processing means and the like can be realized by hardware, by designing a part or the whole of them with, for example, an integrated circuitry. Further, each of the above-described configurations, functions, and the like can be realized by software, by causing a processor to interpret and execute programs that realize respective functions. Information such as programs, tables, and files for realizing respective functions may be placed in a storage unit, such as a memory, a hard disk, and a solid state drive (SSD), or in a recording medium, such as an IC card, an SD card, a DVD, and a BD.

Further, the illustration of control lines and information lines is limited to ones considered to be necessary for the explanation, and not all control lines and information lines on the product are necessarily illustrated. It is realistic to consider that almost all the components are coupled with each other.

What is claimed is:

1. A computer system comprising:
one or more processors; and
a computer code management system,
wherein the computer code management system comprises:
a code management unit configured to manage codes before and after editing of a flow edited by a user using visual programming, with a code management tool capable of version management;
a degree-of-change calculation unit configured to perform processing for obtaining a logic change degree that is an index indicating a degree of change in a logic related difference of differences before and after a code change, and processing for obtaining a layout change degree that is an index indicating a degree of change in a layout related difference of the differences before and after the code change, and storing the logic change degree and the layout change degree in a degree-of-change table, wherein the logic change degree and the layout change degree are stored respectively with an identifier for code before the code change and an identifier for code after the code change; and
a degree-of-change output unit configured to output information based on the logic change degree and the layout change degree, wherein the degree-of-change output unit outputs information represented by a graph plotting transitions of the logic change degree and the layout change degree for code of each version, with an axis of abscissa representing a logic change degree cumulative value and an axis of ordinate representing a layout change degree cumulative value.

2. The computer system for code management according to claim 1, wherein
the visual programming is performed by using a tool for providing a user interface that presents an editing screen of the flow to the user, arranges a plurality of nodes representing processing on the editing screen, and creates the flow by connecting the nodes with lines representing an execution order of processing of the nodes.

3. The computer system for code management according to claim 2, wherein
the logic related difference includes at least one of a difference caused by addition or deletion of the nodes, a difference caused by change in the execution order of nodes, a difference caused by change in processing contents of the nodes, and a difference caused by change in an attribute value (property value) of the nodes.

4. The computer system for code management according to claim 2, wherein
the layout related difference includes a difference caused by change in arrangement position of a node on the editing screen.

5. The computer system for code management according to claim 1, wherein
the degree-of-change calculation unit obtains the logic change degree or the layout change degree by performing weighting according to contents of the logic related difference or the layout related difference.

6. The computer system for code management according to claim 5, further comprising
a user interface that accepts settings of the weighting.

7. The computer system for code management according to claim 1, wherein
the degree-of-change calculation unit suppresses a degree of influence on the layout change degree due to the difference, for a difference whose magnitude is equal to or less than a preset threshold, among layout related differences.

8. The computer system for code management according to claim 1, wherein
the degree-of-change output unit outputs, for each version of code, information indicating the logic change degree and the layout change degree.

9. The computer system for code management according to claim 8, wherein
the degree-of-change output unit has a filtering function of limiting the output of the information on code of a version in which each of the logic change degree or the layout change degree is less than a set threshold.

10. The computer system for code management according to claim 1, further comprising
a cooperation control unit configured to start processing for obtaining the logic change degree and the layout change degree, in response to registration of code of the edited flow in the code management tool.

11. The computer system for code management according to claim 10, wherein
a continuous integration (CI) tool is used to realize the cooperation control unit.

12. The computer system for code management according to claim 1, wherein
the code management tool is GitHub (registered trademark) or GitLab (registered trademark).

13. The computer system for code management according to claim 2, wherein
editing of the flow by the visual programming is performed using Node-RED, and the codes are in a JavaScript Object Notation (JSON) format code.

14. A code management method for causing an information processing device to execute:
managing codes before and after editing of a flow edited by a user using visual programming, with a code management tool capable of version management;
obtaining a logic change degree that is an index indicating a degree of change in a logic related difference of differences before and after a code change, and a layout change degree that is an index indicating a degree of change in a layout related difference of the differences before and after the code change;
storing the logic change degree and the layout change degree in a degree-of-change table, wherein the logic change degree and the layout change degree are stored respectively with an identifier for code before the code change and an identifier for code after the code change; and
outputting information based on the logic change degree and the layout change degree, wherein the outputting comprises outputting information represented by a graph plotting transitions of the logic change degree and the layout change degree for code of each version, with an axis of abscissa representing a logic change degree cumulative value and an axis of ordinate representing a layout change degree cumulative value.

\* \* \* \* \*